(No Model.) 2 Sheets—Sheet 1.

W. F. SWEET.
VEHICLE SPRING.

No. 289,361. Patented Nov. 27, 1883.

Attest:
Nettie B. Collins
E. W. Johnson

Inventor:
William F. Sweet
Atty.

(No Model.) 2 Sheets—Sheet 2.
W. F. SWEET.
VEHICLE SPRING.
No. 289,361. Patented Nov. 27, 1883.
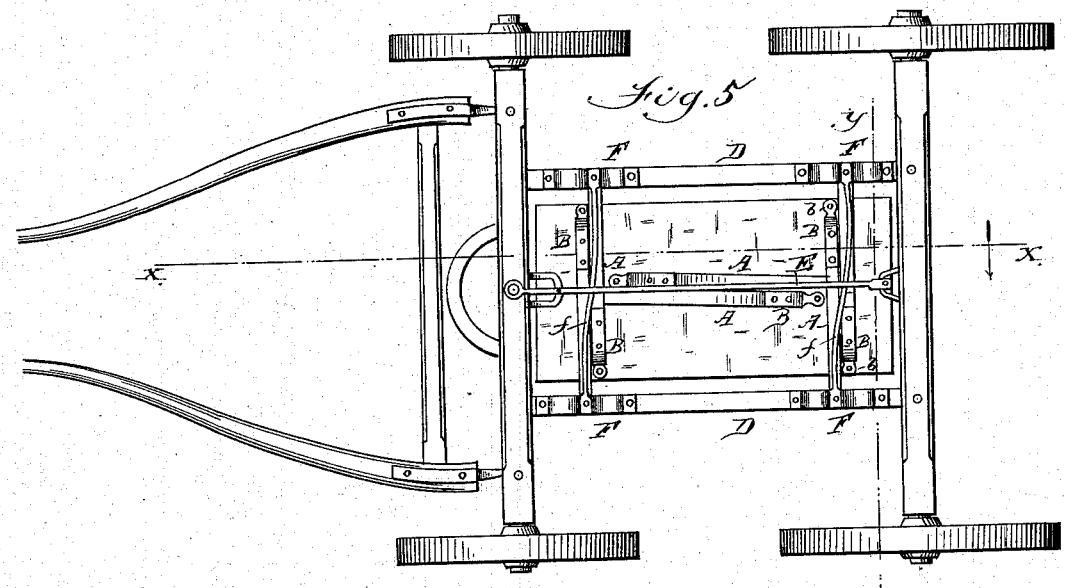
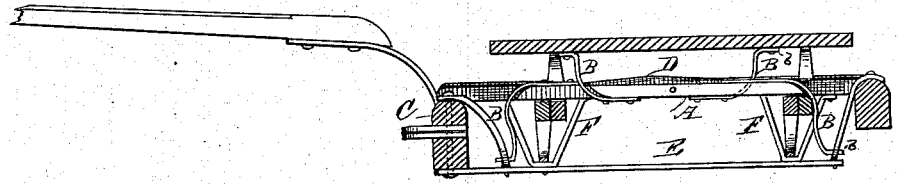
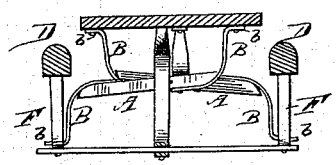
Attest;
Nettie B. Collins.
E. W. Johnson.
Inventor;
William F. Sweet
Atty.

UNITED STATES PATENT OFFICE.

WILLIAM F. SWEET, OF ELMIRA, ASSIGNOR OF ONE-HALF TO ABRAM L. BARTHOLOMEW, OF SEELY CREEK, NEW YORK.

VEHICLE-SPRING.

SPECIFICATION forming part of Letters Patent No. 289,361, dated November 27, 1883.

Application filed August 9, 1883. (No model.)

*To all whom it may concern:*

Be it known that I, WILLIAM F. SWEET, a citizen of the United States of America, residing at Elmira, in the county of Chemung and State of New York, have invented certain new and useful Improvements in Springs for Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in springs for vehicles, its object being to provide a spring which is substantially a perfect equalizer and will always carry a load or weight parallel with the supporting means, so that when the same is applied to a wagon or similar structure one part of the body of the same will not settle more than another; and to this end my invention consists in the construction of the spring, which spring is composed of two bars which cross and are pivoted to each other centrally and are provided at their ends with springs, which project upwardly and downwardly from the cross-bars.

My invention also consists in the combination of such springs with a vehicle or other similar structure.

Figure 2:
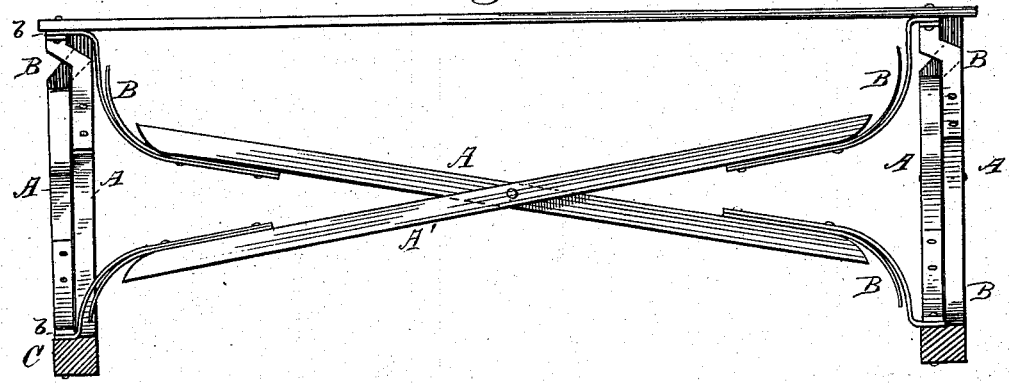
Figure 3:
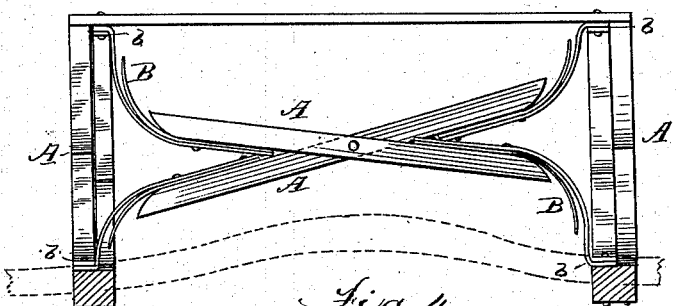
Figure 4:
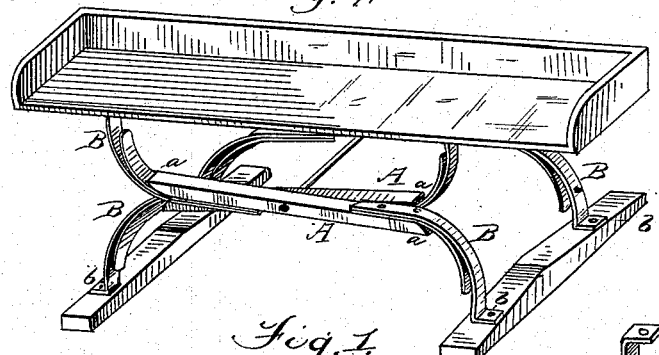
Figure 1:
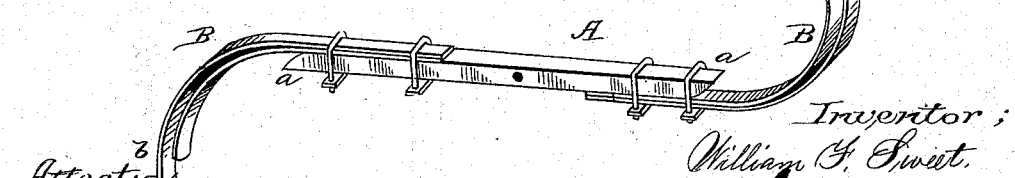

In the accompanying drawings, which illustrate my invention, Figure 1 is a perspective view of one of the cross-bars detached. Figs. 2 and 3 are sectional views, showing similarly-constructed springs applied to a vehicle. Fig. 4 is a perspective view of my improved spring applied to the seat of a vehicle. Fig. 5 is a bottom view of a vehicle provided with my improved spring, and showing one manner of bracing the same, in which case three cross-springs are employed. Figs. 6 and 7 are sectional views taken through the lines *x x* and *y y* of Fig. 5.

In the accompanying drawings I have shown two ways of applying my spring to a vehicle, though it is evident that I may provide numerous modifications without departing from the spirit of my invention, the main feature of my invention being in the particular construction of the springs, whereby the body of a vehicle will always be parallel to that portion of the vehicle which supports the body, no matter upon what portion of the body the weight may be placed.

By reference to the accompanying drawings, it will be seen that A represents the cross-bars, which are pivoted to each other at their central portion, which connecting means may be either a transverse bar or a bolt, which is of sufficient length to extend through both of the bars A A, or they may be coupled to each other by plates somewhat similar in construction to whiffletree-plates. The ends of these bars, as shown at *a a*, are rounded upon their upper and lower edges, and to opposite sides of the cross-bar are attached the springs B B, which springs in light vehicles—as buggies, children's carriages, &c.—will consist of a single plate, though in heavy vehicles—as carriages, market-wagons, and the like—double plates may be used, in which case the inner and outer springs have different curves, so that the inner spring, or the one next to the cross-bar A, will not come in play until the outer spring is depressed upon the same. These springs may be secured to the cross-bar either by bolts, clips, or other usual means of fastening. The bar A, at its extreme end, is rounded, which curved portion commences at the end of the bar and terminates at the portion where it meets the inner side of the spring, as shown. The outer ends of the springs are bent outwardly, so as to provide a foot, as shown at *b*, which affords a means for securing the same to the running-gear and body of a vehicle, which securing means may be either a clip, bolt, or equivalent.

The bars A A, to which the springs B B are attached, may be made either of wood or of wood and metal plates, which plates may be attached to the same for the purpose of bracing the bars. These bars may be made of iron or steel, and the springs may be welded or otherwise secured, as hereinbefore described;

to the ends of the bars. In every case these cross-bars are made of perfectly rigid material.

Having thus described the main feature of my invention, I will now proceed to describe the manner in which the aforesaid spring and bars may be applied to a vehicle.

In Figs. 2 and 3 of the accompanying drawings, A A are the cross-bars, which are provided with end springs. In this modification there are four sets of cross-bars used in the construction of a wagon, thus giving sixteen points of spring, the side spring-bars being attached to the bed of the wagon-body and to the front bolster and rear axle, this front cross-bar or bolster being indicated by the letter C, and to the same is attached a fifth-wheel, which may be capable of a universal movement, the fifth-wheel being attached to the axle in the usual manner.

The front and rear springs in a wagon constructed as shown in Fig. 2 have their ends bent, so as to bring the ends of the springs on a direct line over each other, so that their ends may be secured to the wagon-body, bolsters, or axles by a single clip, which clip will connect the end of the springs which run at right angles with each other.

In Figs. 5, 6, and 7 of the accompanying drawings, I have shown my invention applied to a side-bar buggy, similar letters indicating the parts hereinbefore described. In these figures of the drawings, D D represent the side bars; E, the perch, and F braces or supporting means, which are attached to the under side of the side bars. From the upper side of the rear axle and bolster I provide braces which extend downwardly, and are secured to the perch E, either by means of bolts or clips and the braces or bails, which extend downwardly under the side bars, are connected to each other by cross-bars *f*, which are contructed substantially as shown in the accompanying drawings. In this style of vehicle I provide three sets of springs, the center spring extending under the body of the buggy, and attached to the same by the upwardly-projecting springs, while the downwardly-projecting springs rest upon the downwardly-projecting loops attached to the bolster and rear axle. The upwardly-projecting ends of the front and rear cross-bars are also secured to the body, while their downwardly-projecting ends are secured to the lower portion of the bails F at a point immediately over the cross-bars *f f*. By this form of construction I provide a buggy the body of which will always rest parallel with the running-gear, no matter at what point the weight is carried, and will obviate the tilting of the body.

The spring hereinbefore described may be constructed of two or more plates, and when thus constructed the plates will be bent at different curves, and the inner plate will not come into use until the outer plate bears upon the same. Thus a wagon can be made that is capable of riding easily without jolt, no matter what weight may be placed within the same.

If desirable, upon applying my improved spring to side-bar buggies the reach can be dispensed with, as the side bars will form a connecting means, and the ends of the springs may be coupled direct to the axle.

From the foregoing it will be seen that my improved spring may be applied to all ordinary forms of wagons, from the heaviest stage-coach to the lightest child's carriage, and the same will operate effectively to keep the body always on a level.

By actual experiments with my improved spring I have found that a person of ordinary weight sitting upon the corner of the vehicle will not displace the parallelism of the body with relation to the axles.

In some cases it may be desirable to dispense with the spring on the lower ends of the cross-bars A A, in which case the ends of the said cross-bars may be clipped directly to the axle and bolster, and the cross-spring may be attached to the end of the longitudinal bars A A.

I am aware that prior to my invention vehicles have been provided with cross-bars pivoted to each other, and provided at one end with C-shaped springs, which were attached indirectly to the body of the vehicle, and I do not claim such as my invention, as the same would not act in the same manner as my improved springs as far as the equalization of the depression of the body of the vehicle is concerned. I am also aware that cross-bars pivoted to each other have been provided with springs which lie within the cross-bars. This construction is also foreign to my invention.

Having thus described my invention, what I claim as new, and desire to secure by Letters Patent, is—

1. The improved spring for vehicles, consisting of the cross-bars A A, pivotally connected to each other, and provided at their ends with springs extending in opposite directions above and below the cross-bars, substantially as shown, and for the purpose set forth.

2. The improved spring for vehicles, consisting of a pair of rigid cross-bars having their ends curved in opposite directions, and provided with springs B B, attached to the ends of said cross-bars, substantially as shown.

3. The spring for vehicles herein described, consisting of the rigid cross-bars pivoted centrally to each other, and provided with end springs which extend in opposite directions, and are attached to opposite sides of the cross-bars, said springs being provided with outwardly-projecting feet, substantially as shown.

4. The equalizing-springs herein described, consisting of the cross-bars pivoted to each other, and provided with end springs extending in opposite directions, said springs being attached to the body and running-gear for vehicles by means of clips or other equivalents, without intermediate connecting means, said springs being adapted to be used in connection with a vehicle in pairs for the purpose of keeping the body of the vehicle parallel to the running-gear and allowing only a vertical depression of the whole body, which will be substantially equal at every point, substantially as described.

In testimony whereof I affix my signature in presence of two witnesses.

WM. F. SWEET.

Witnesses:
 E. H. JOHNSON,
 JOHN E. BEALL.